June 30, 1970 R. F. J. FILIPOWSKY 3,518,547

DIGITAL COMMUNICATION SYSTEM EMPLOYING MULTIPLEX TRANSMISSION OF MAXIMAL LENGTH BINARY SEQUENCES

Filed June 14, 1966 9 Sheets-Sheet 1

INVENTOR
RICHARD F. J. FILIPOWSKY
BY James A. de Peyster, Jr.
AGENT

| | | | | | | | | |
|---|---|---|---|---|---|---|---|---|
| $S_1$ | + | + | + | + | + | + | + | + |
| $S_2$ | + | + | − | + | + | − | − | − |
| $S_3$ | + | − | + | − | + | + | − | − |
| $S_4$ | + | − | − | + | − | + | + | − |
| $S_5$ | + | − | − | − | + | − | + | + |
| $S_6$ | + | + | − | − | − | + | − | + |
| $S_7$ | + | + | + | − | − | − | + | − |
| $S_8$ | + | − | + | + | − | − | − | + |
| | $t_1$ | $t_2$ | $t_3$ | $t_4$ | $t_5$ | $t_6$ | $t_7$ | $t_8$ |

FIG. 7a

| | |
|---|---|
| S 1 | −1 |
| S 2 | +1 |
| S 3 | −1 |
| S 4 | +1 |
| S 5 | +1 |
| S 6 | −1 |
| S 7 | +1 |
| S 8 | +1 |

FIG. 7b

| t1 | t2 | t3 | t4 | t5 | t6 | t7 | t8 |
|---|---|---|---|---|---|---|---|
| −1 | −1 | −1 | −1 | −1 | −1 | −1 | −1 |
| +1 | +1 | −1 | +1 | +1 | −1 | −1 | −1 |
| −1 | +1 | −1 | +1 | −1 | −1 | +1 | +1 |
| +1 | −1 | −1 | +1 | −1 | +1 | +1 | −1 |
| +1 | −1 | −1 | −1 | +1 | −1 | +1 | +1 |
| −1 | −1 | +1 | +1 | +1 | −1 | +1 | −1 |
| +1 | +1 | +1 | −1 | −1 | −1 | +1 | −1 |
| +1 | −1 | +1 | +1 | −1 | −1 | −1 | +1 |

FIG. 7c

| | | | | | | | |
|---|---|---|---|---|---|---|---|
| +2 | −2 | −2 | +2 | −2 | −6 | +2 | −2 |

FIG. 7d

| | | | | | | | |
|---|---|---|---|---|---|---|---|
| +2 | −2 | −2 | +2 | 0 | −6 | +2 | −2 |

FIG. 7e

FIG. 7f

| t1 | t2 | t3 | t4 | t5 | t6 | t7 | t8 | FIG. 7f | |
|---|---|---|---|---|---|---|---|---|---|
| +2 | −2 | −2 | +2 | 0 | −6 | +2 | −2 | −6 | I1 |
| +2 | −2 | +2 | +2 | 0 | +6 | −2 | +2 | +10 | I2 |
| +2 | +2 | −2 | −2 | 0 | −6 | −2 | +2 | −6 | I3 |
| +2 | +2 | +2 | +2 | 0 | −6 | +2 | +2 | +6 | I4 |
| +2 | +2 | +2 | −2 | 0 | +6 | +2 | −2 | +10 | I5 |
| +2 | −2 | +2 | −2 | 0 | −6 | −2 | −2 | −10 | I6 |
| +2 | −2 | −2 | −2 | 0 | +6 | +2 | +2 | +6 | I7 |
| +2 | +2 | −2 | +2 | 0 | +6 | −2 | −2 | +6 | I8 |

FIG. 8a FIG. 8b

| | FIG. 8a | t1 | t2 | t3 | t4 | t5 | t6 | t7 | t8 |
|---|---|---|---|---|---|---|---|---|---|
| $S_1$ | 0 | 0 | 0 | 0 | 0 | 0 | 0 | 0 | 0 |
| $S_2$ | 1 | +1 | +1 | −1 | +1 | +1 | −1 | −1 | −1 |
| $S_3$ | 0 | 0 | 0 | 0 | 0 | 0 | 0 | 0 | 0 |
| $S_4$ | 1 | +1 | −1 | −1 | +1 | −1 | +1 | +1 | −1 |
| $S_5$ | 1 | +1 | −1 | −1 | −1 | +1 | −1 | +1 | +1 |
| $S_6$ | 0 | 0 | 0 | 0 | 0 | 0 | 0 | 0 | 0 |
| $S_7$ | 1 | +1 | +1 | +1 | −1 | −1 | −1 | +1 | −1 |
| $S_8$ | 1 | +1 | −1 | +1 | +1 | −1 | −1 | −1 | +1 |

| | | | | | | | | |
|---|---|---|---|---|---|---|---|---|
| FIG. 8c | 5 | −1 | −1 | +1 | −1 | −3 | 1 | −1 |
| FIG. 8d | 6.4 | −1.28 | −1.28 | +1.28 | −1.28 | −3.84 | 1.28 | −1.28 |
| FIG. 8e | 6.4 | −0.28 | −0.28 | +0.28 | −0.28 | −3.84 | 1.28 | −1.28 |

FIG. 8f FIG. 8g FIG. 8h

| FIG. 8f | | | | | | | | FIG. 8g | FIG. 8h |
|---|---|---|---|---|---|---|---|---|---|
| +6.4 | −0.28 | −0.28 | +0.28 | −0.28 | −3.84 | 1.28 | −1.28 | 2.00 | 0 |
| +6.4 | −0.28 | +0.28 | +0.28 | −0.28 | +3.84 | −1.28 | +1.28 | 10.22 | 1 |
| +6.4 | +0.28 | −0.28 | −0.28 | −0.28 | −3.84 | −1.28 | +1.28 | 2.00 | 0 |
| +6.4 | +0.28 | +0.28 | +0.28 | +0.28 | −3.84 | +1.28 | +1.28 | 6.22 | 1 |
| +6.4 | +0.28 | +0.28 | −0.28 | −0.28 | +3.84 | +1.28 | −1.28 | 8.24 | 1 |
| +6.4 | −0.28 | +0.28 | −0.28 | +0.28 | −3.84 | −1.28 | −1.28 | 0.00 | 0 |
| +6.4 | −0.28 | −0.28 | −0.28 | +0.28 | +3.84 | +1.28 | +1.28 | 12.24 | 1 |
| +6.4 | +0.28 | −0.28 | +0.28 | +0.28 | +3.84 | −1.28 | −1.28 | 9.24 | 1 |

FIG. 9a FIG. 9b

| | FIG. 9a | FIG. 9b |
|---|---|---|
| $S_1$ | −1 | −8 |
| $S_2$ | +1 | +8 |
| $S_3$ | −1 | −8 |
| $S_4$ | +1 | +8 |
| $S_5$ | +1 | +8 |
| $S_6$ | −1 | −8 |
| $S_7$ | +1 | +8 |
| $S_8$ | +1 | +8 |

FIG. 9c

| $\Delta_1$ | $\Delta_2$ | $\Delta_3$ | $\Delta_4$ | $\Delta_5$ | $\Delta_6$ | $\Delta_7$ | $\Delta_8$ |
|---|---|---|---|---|---|---|---|
| −8 | −8 | −8 | −8 | −8 | −8 | −8 | −8 |
| −16 | 0 | +8 | −8 | 0 | 0 | +8 | +8 |
| 0 | 0 | 0 | +8 | −16 | +16 | 0 | −8 |
| 0 | −8 | +16 | −8 | 0 | +8 | −16 | +8 |
| −8 | +8 | 0 | +8 | −8 | −8 | 0 | +8 |
| +8 | 0 | +8 | −8 | −8 | 0 | +8 | −8 |
| 0 | +8 | −8 | −8 | 0 | +8 | −8 | +8 |
| +8 | −16 | 0 | +8 | −8 | 0 | 0 | +8 |

FIG. 9d

| | |
|---|---|
| $S_1$ | −1 |
| $S_2$ | +1 |
| $S_3$ | −1 |
| $S_4$ | +2 |
| $S_5$ | +1 |
| $S_6$ | −1 |
| $S_7$ | +1 |
| $S_8$ | +1 |

FIG. 9e

| $\Delta_1$ | $\Delta_2$ | $\Delta_3$ | $\Delta_4$ | $\Delta_5$ | $\Delta_6$ | $\Delta_7$ | $\Delta_8$ |
|---|---|---|---|---|---|---|---|
| −4 | +8 | +20 | −16 | +4 | +8 | −20 | +16 |

FIG. 9f

| | |
|---|---|
| $S_1$ | −1 |
| $S_2$ | +1 |
| $S_3$ | −1 |
| $S_4$ | +4 |
| $S_5$ | +1 |
| $S_6$ | −1 |
| $S_7$ | +1 |
| $S_8$ | +1 |

FIG. 9g

| $\Delta_1$ | $\Delta_2$ | $\Delta_3$ | $\Delta_4$ | $\Delta_5$ | $\Delta_6$ | $\Delta_7$ | $\Delta_8$ |
|---|---|---|---|---|---|---|---|
| −12 | −8 | +28 | −32 | +12 | +8 | −28 | +32 |

FIG. 10

| | $\Delta_0$ | $\Delta_1$ | $\Delta_2$ | $\Delta_3$ | $\Delta_4$ | $\Delta_5$ | $\Delta_6$ | $\Delta_7$ | $\Delta_8$ | $\Delta_9$ | $\Delta_{10}$ | $\Delta_{11}$ | $\Delta_{12}$ | $\Delta_{13}$ | $\Delta_{14}$ | $\Delta_{15}$ | $\Delta_{16}$ |
|---|---|---|---|---|---|---|---|---|---|---|---|---|---|---|---|---|---|
| $S_1$ | +16 | +16 | +16 | +16 | +16 | +16 | +16 | +16 | +16 | +16 | +16 | +16 | +16 | +16 | +16 | +16 | +16 |
| $S_2$ | −16 | +8 | −32 | +28 | −16 | −16 | +20 | −8 | −4 | 0 | −16 | +12 | +8 | +16 | +16 | 0 | −16 |
| $S_3$ | +16 | −16 | +16 | −24 | −8 | +12 | −4 | 0 | −12 | +4 | −12 | +28 | 0 | +20 | +4 | −24 | +16 |
| $S_4$ | −16 | +16 | −24 | −8 | +12 | −4 | 0 | −12 | +4 | −12 | +28 | 0 | +20 | +4 | −24 | +16 | −16 |
| $S_5$ | +16 | −24 | −8 | +12 | −4 | 0 | −12 | +4 | −12 | +28 | 0 | +20 | +4 | −24 | +16 | −16 | +16 |
| $S_6$ | −16 | +8 | 0 | −12 | +8 | −20 | +8 | −8 | +16 | +20 | −4 | +24 | −40 | +20 | −12 | +8 | −16 |
| $S_7$ | +16 | +16 | −24 | 0 | −12 | 0 | −4 | +20 | +8 | +16 | 0 | −20 | +4 | −8 | +12 | −24 | +16 |
| $S_8$ | +16 | −24 | 0 | −12 | 0 | −4 | +20 | +8 | +16 | 0 | −20 | +4 | −8 | +12 | −24 | +16 | +16 |
| $S_9$ | −16 | +16 | −24 | −8 | +4 | +12 | +12 | +20 | −12 | 0 | −20 | +12 | −4 | −20 | +20 | +8 | −16 |
| $S_{10}$ | +16 | −24 | −8 | +4 | +12 | +12 | +20 | −12 | 0 | −20 | +12 | −4 | −20 | +20 | +8 | −16 | +16 |
| $S_{11}$ | −16 | +8 | −8 | +4 | +20 | +12 | −8 | +4 | −32 | +32 | −28 | 0 | +4 | +12 | −12 | +8 | −16 |
| $S_{12}$ | +16 | +8 | −8 | +12 | +20 | −16 | +8 | −28 | +20 | −8 | −24 | +24 | −4 | −8 | +12 | −24 | +16 |
| $S_{13}$ | +16 | +8 | 0 | +12 | −8 | 0 | −24 | +24 | −20 | −4 | 0 | +16 | −24 | +16 | −20 | +8 | +16 |
| $S_{14}$ | +16 | +16 | 0 | −16 | +8 | −32 | +28 | −16 | −16 | +20 | −8 | −4 | 0 | −16 | +12 | +8 | +16 |
| $S_{15}$ | +16 | 0 | −16 | +8 | −32 | +28 | −16 | −16 | +20 | −8 | −4 | 0 | −16 | +12 | +8 | +16 | +16 |
| $S_{16}$ | 0 | −16 | +8 | −32 | +28 | −16 | −16 | +20 | −8 | −4 | 0 | +16 | +12 | +8 | +16 | +16 | 0 |
| Σ | 240 | 224 | 192 | 208 | 208 | 190 | 216 | 216 | 216 | 192 | 192 | 200 | 184 | 228 | 228 | 224 | 240 |

3,518,547

DIGITAL COMMUNICATION SYSTEM EMPLOYING MULTIPLEX TRANSMISSION OF MAXIMAL LENGTH BINARY SEQUENCES

Richard F. J. Filipowsky, Huntsville, Ala., assignor to International Business Machines Corporation, Armonk, N.Y., a corporation of New York Filed June 14, 1966, Ser. No. 557,471
Int. Cl. H03k *13/32*
U.S. Cl. 325—42 13 Claims

ABSTRACT OF THE DISCLOSURE

A digital communication system wherein each elemental message portion is encoded into one of a predetermined set of orthogonal quasi-random binary sequences and wherein a plurality of such sequences are linearly superposed for transmission. The transmitter station having a shift register PN sequence generator, a plurality of input circuits, a plurality of multipliers and a superposing means. The receiving station having a shift register PN sequence generator, multipliers and integrators for recovering the transmitted information.

This invention relates to digital communication systems employing finite sets of highly distinguishable transmission wave forms for transmitting information. More particularly, this invention relates to digital communication systems wherein each elemental message portion is encoded into one of a predetermined set of orthogonal quasi-random binary sequences and wherein a plurality of such binary sequences are linearly superposed for transmission.

In general, digital communiction systems may be said to employ either analog or digital techniques for the transmission of signals. In communication systems using analog techniques, the rectangular digital wave forms, such as are used in digital computers, serve to modulate a carrier wave by means of well known amplitude, frequency, or phase modulation techniques. At the receiver a suitable analog demodulator operates on the modulated carrier wave to recover the original rectangular wave form as accurately as possible. Such communication systems are subject to the disadvantage that the digital wave forms which are finally reproduced at the output of the receiver are affected not only by the actual digital information transmitted, but also by the instantaneous phase difference between the carrier and the system clock, as well as on the detailed filter characteristics of all the filters in the transmission channel, and on random noise.

Communication systems using truly digital transmission techniques possess certain advantages over the systems which use analog techniques: In such communication systems, the rectangular digital wave forms serve to select members of a predetermined finite set of highly distinguishable transmission wave forms. The pre-knowledge of the characteristics of each member of the set of transmission wave forms can be used to design receiving apparatus including a set of optimum detection devices, each of which is responsive to only one member of the set of transmission wave forms. Hence, in spite of the fact that the predetermined transmission wave forms are subject to the inevitable distortion and random noise factors, each optimum detection device is capable of making the simple decision as to whether it is more probable than not that its associated transmission wave form was received during a particular transmission interval.

From the foregoing it is apparent that digital communication systems using predetermined sets of transmission wave forms in combination with optimum detection devices are relatively insensitive to noise and channel distortion. This characteristic is most pronounced when the members of the set of transmission wave forms are highly distinguishable from each other. Wave forms having a distinguishability of the highest possibel order are known as orthogonal wave forms, which is to say that the average product of pairs of such wave forms is zero. Therefore, digital communications systems using orthogonal wave forms in combination with optimum detection devices would be expected to deliver superior performance in the presence of large amounts of random noise and channel distortion.

Although there are a number of different classes of wave forms from which orthogonal sets can be selected, one class of wave forms which is particularly suitable for use in digital transmission systems is the class of quasi-random binary sequences which are also called pseudo-noise (PN) sequences. The principal advantage of PN sequences is that large sets of orthogonal PN sequences can be generated with relatively simple shift register generators and detected with relatively simple matched filter extractors. A further advantage of PN sequences is that their immunity to noise can be increased by increasing the length of the sequences rather than by increasing the power of the signal as in conventional systems. Hence, orthogonal PN sequences have proved useful in space communications systems which must use a minimum of power to transmit information in the presence of high noise levels. In fact, it can be shown that, for a given noise level, the larger the set of orthogonal PN sequences, and, hence the longer the PN sequences employed, the less energy is required to successfully transmit each bit of information. However, this advantage of communication systems using large sets of long, orthogonal PN sequences is "purchased" at the "price" of low bit densities, i.e., low numbers of bits of information per second for each cycle per second of channel bandwidth.

It is therfore an object of my invention to provide a communication system capable of achieving high bit density while retaining the advantages of using large sets a long orothgonal PN sequences.

Another object of my invention is to provide a multiplex communication system wherein long orthogonal PN sequences are superposed for transmission.

A further object of my invention is to provide simple and inexpensive means for generating sets of orthogonal PN sequences for use in multiplex communication systems.

In accordance with the above objects I provide a digital communication system including a transmitting station and a receiving station connected by a transmission link. At the transmitting station I provide a shift register PN sequence generator and a plurality of input circuits for receiving and holding input information. A plurality of multipliers are arranged so as to multiply the contents of successive input circuits with the contents of successive stages of the shift register PN sequence generator. A summation device serves to linearly superpose the PN sequences which appear at the outputs of the multipliers when the shift register generator is cycled. The composite pulse amplitude modulated wave form which appears at the output of the summation device is introduced into the transmission link.

At the receiving station I provide a shift register PN sequence generator identical to the PN sequence generator at the transmitting station. A plurality of multipliers are arranged so as to multiply the composite signal from the transmission link with the contents of successive stages of the shift register PN sequence generator. An integrator serves to integrate the output of each multiplier, and decision devices responsive to the contents of the integrators serve to recover the input information.

An advantage of my invention is in providing a communication system which may be easily adjusted for optimum performance in the presence of different channel noise levels simply by adjusting the length of the PN sequences employed.

Another advantage of my invention is in providing a multiplex communication system in which the number of channels may be easily increased or decreased.

Other objects and advantages of my invention will be pointed out in the following description and claims and illustrated in the accompanying drawings which disclose by way of example the principle of the invention and the best mode which has been contemplated of applying that principle.

Figure 1:
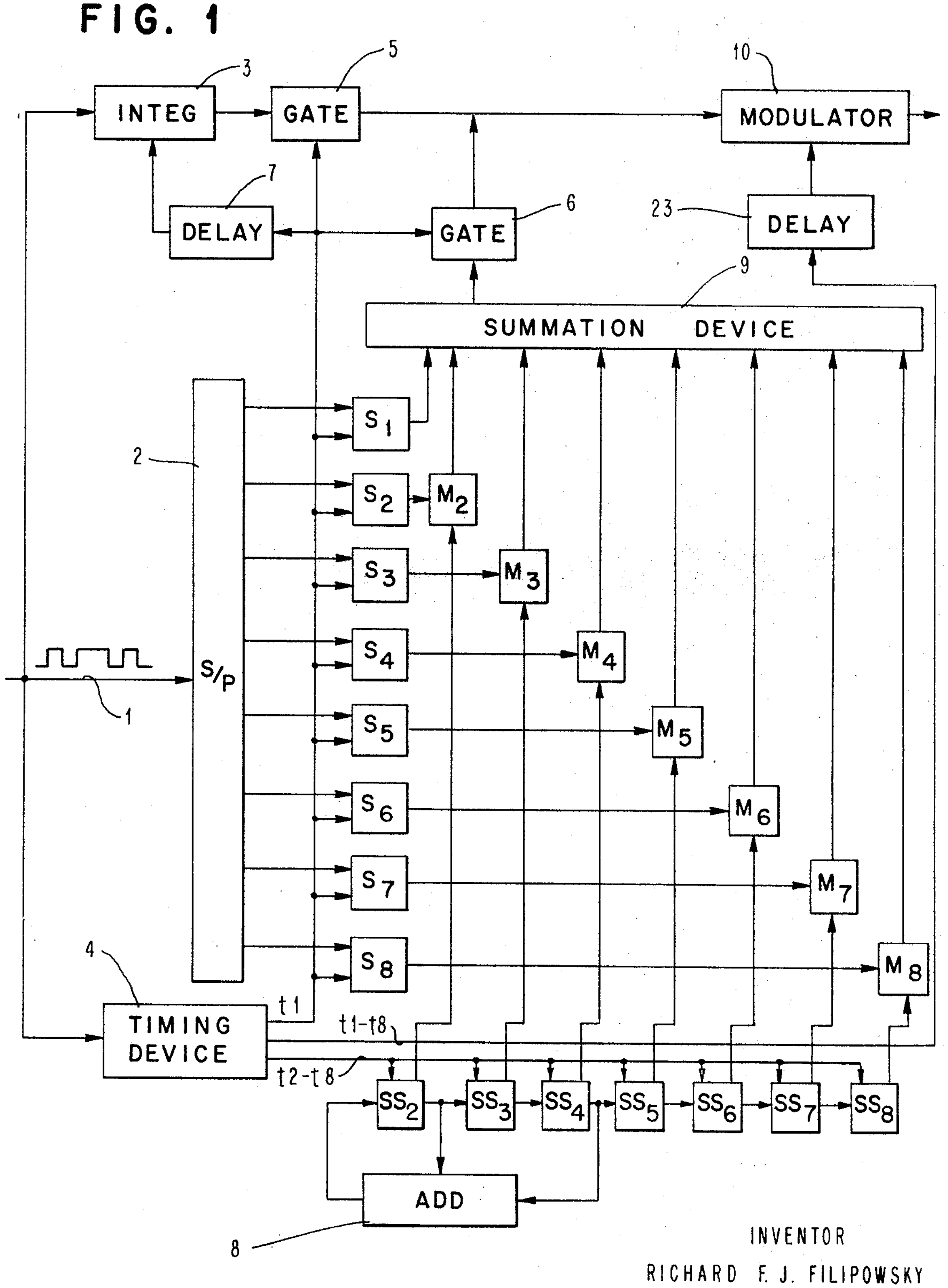
FIG. 1 is a detailed block diagram of the transmitting station of my digital communication system.

FIGS. *7a–7f* illustrate one example of the operation of my digital communication system.

FIGS. *8a–8h* illustrate another example of the operation of my digital communication system.

FIGS. *9a–9g* illustrate one example of the synchronization of my digital communication system.

FIG. 10 illustrates another example of the synchronization of my digital communication system.

BACKGROUND OF THE INVENTION

The simplest type of digital transmission system is the binary system. In a binary system, the input information serves to select one of two transmission waveforms or symbols during each transmission cycle. If one of the two symbols is defined as the non-transmission state, the system is called a passive binary system, or an on-off system. An advantage can be gained by providing for equal transmission intervals of duration T for each selection of a symbol. Such systems are called serial binary systems or synchronous binary systems or clocked binary systems. Advantages of binary systems are the simplicity of receiver design and the detectability of the transmission waveforms.

The disadvantage of binary systems is the fact that any waveform representing one of the two symbols requires a minimum bandwidth, if it is to be restricted to a specified time interval T. In fact, the uncertainty principle states that "it is not possible to truncate a waveform simultaneously in both domains. Either the time function or the spectral function, or both, will extend, theoretically, to infinity." For practical purposes it is sufficient to fix the lower limit for the product of the time duration T and the effective bandwidth occupied by the spectrum of the waveform W at the value 1:

$$WT \geq 1 \quad (1)$$

This means that the maximum speed of binary information transmission in practical systems is about 1 bit per cycle bandwidth per second. A voice channel of 3,000 c./s. bandwidth has therefore a practical upper limit of binary information transmission at 3,000 bits/sec. The theoretical limit for low pass channels transmitting binary signals is at the so-called Nyquist rate of two bits per cycle bandwidth per second, but many practical difficulties prevent one from reaching this limit with binary transmission systems.

On the other hand it has been known for many years that the theoretical channel capacity for discrete information transmission is not determined by the bandwidth alone, but also by the noise level of the channel. The theoretical channel capacity is given by C. E. Shannon, "Communication in the Presence of Noise," Proceedings of the I.R.E., vol. 37, January 1949, pages 10–21, as:

$$C = W.\log_2(1+S/N) \quad (2)$$

where C is the theoretical channel capacity in bits/second; S is the average signal power and N is the average noise power in the channel with S and N in the same units.

This formula indicates that a channel should be able to transmit $\log_2(1+S/N)$ bits/cycle bandwidth/second. Assuming that a good telephone channel is maintained for operation with a minimum of 50 db signal to noise ratio, one can see that the theoretical limit would be at $\log_2(100.001)=16.6$ bits/cycle bandwidth/sec. A good telephone channel should be able to handle up to 49,800 bits/sec. Present systems reach less than 6% of this value.

It is indicated that Shannon's theoretical upper limit can be reached only when the duration of the transmission waveforms is relatively long as compared with the reciprocal of the bandwidth of the channel, or, in other words, the WT product of the transmission waveforms is as large as possible. It is further indicated that the spectrum of the transmission waveforms should be uniformly spread over the available channel bandwidth (if the noise is white) so that the signals will have a noise-like character. Further, the transmitter should not be peak power limited although it may be average power limited. None of the prior art systems possess these characteristics, and Shannon does not suggest how to build such a system.

Several approaches have been taken to find some optimum encoding procedure which will fulfill some or all of the above requirements so as to achieve a transmission system which comes close to Shannon's theoretical upper limit of the data transmission rate. One of the most promising approaches is to encode the data into a larger number of transmission waveforms than the usual two (as in binary systems). Such transmission systems are known as higher order alphabet systems or *m*-ary digital systems. One class of *m*-ary systems includes the "multi-level" and "multi-phase" systems known to those skilled in the art. This class also includes the more general "multi-state" systems which combine the "multi-level" and "multi-phase" features. Hence, "multi-state" systems are two-dimensional systems possessing two degrees of freedom. This means, that at any given time there can only be one signal within a given bandwidth and interval (WT) and this signal may assume one discrete amplitude and one discrete phase state out of A different amplitude states and P different phase states. The order of the signal alphabet is $m=A \cdot P$, but the detectability of all of these *m* different symbols is not the same and the error probability for all possible transitions is quite unsymmetrical.

Another class of *m*-ary systems are the systems using *m* different orthogonal symbols. The simplest system in this class is the multi-frequency shift keying system in which each symbol has a different carrier or subcarrier frequency and therefore can be completely independent of all other symbols, provided the spectra of all symbols are non-overlapping. A system of this type with $m$ independent symbols is an $m$-dimensional $m$-ary system. There are naturally all combinations possible between multi-frequency systems and the previously described multi-state systems. Such hybrid systems will be $m$-ary systems with $n$ dimension, where $m>n$.

Other orthogonal systems have been suggested. Most of these postulate that all $m$-symbols should be defined for the same signal base (WT) and usually also for the same length T and bandwidth W, notwithstanding the fact that some of the symbols may concentrate their energy only into one part of the time interval T or one part of the frequency band W.

Figures 3, 4:
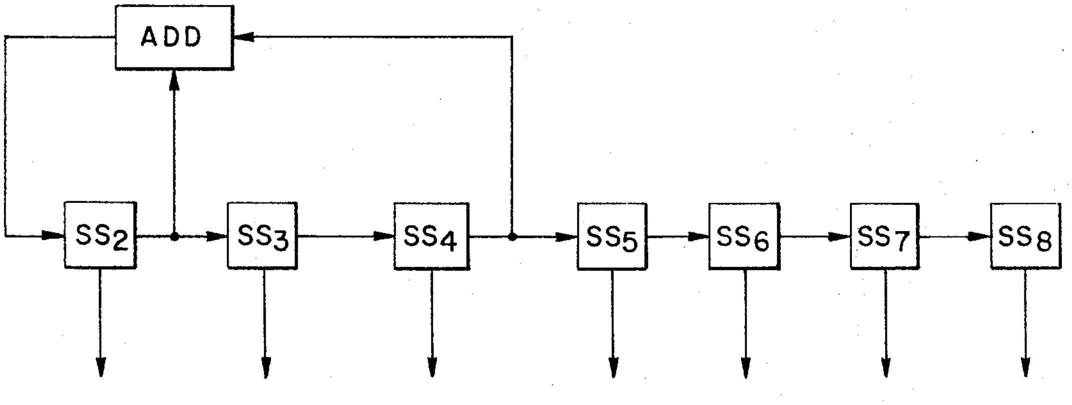
FIG. 3 shows a signal matrix representing a set of orthogonal M-sequences.
FIG. 4 is a detailed block diagram of a shift register PN sequence generator for generating the sequences shown in FIG. 3.

Another type of orthogonal system is a system employing sets of orthogonal binary sequences. Such sequences can be derived in many ways. One of the simplest procedures is explained by A. J. Viterbi, "On Coded Phase-Coherent Communications," IRE Transactions, vol. Set-7, No. 1, March 1961, pages 3–14. For example, assuming that a set of 8 orthogonal code words is desired, one starts with the 7 non-zero binary words forming together with 000 the complete set of all 8 binary words with 3 digits. The other 4 letters in each code word are then computed by a simple binary operation. The binary addition of the first and third elements gives the fourth element. The addition of the second and fourth element gives the fifth and so on until the addition of the K–3 and K–1 element gives the Kth element ($K=7$ in this case). Taking for example the word 001, the next digit is formed by the binary addition "0" and "1," resulting in "1" as the fourth digit. This "1" add to the second digit, "0," gives "1" as the fifth digit, while the fifth digit, "1," and the third digit "1" yield "0" as the sixth digit and so on. Note that a simple re-ordering of all the code words thus generated makes it clear that any one code word can be used to generate all other words merely by cyclically shifting all digits one position to form each new word. This gives these codes the name shift register codes and FIG. 3 shows a block diagram of a shift register for generating them. They are also called PN (pseudo noise) sequences or $m$-sequences. The first expression indicates the quasi-random or noise-like character of the arrangement of zero and ones, while the second term indicates that for a given number of positions of the shift register these sequences are the linear sequences of maximum length $m$ which can be created before the sequence begins to repeat itself periodically. For $n$ stages of the shift register the length of the sequence is $2n-1$. Thus with a shift register of only 20 stages one can generate a sequence which runs for 1,048,575 digits before repeating itself. The seven shift register codes or $m$-sequences plus an additional all "$o$" word comprise the desired set of eight orthogonal code words. Note that this set of code words satisfies two of Shannon's requirements: they are noise-like in character, and they are of long duration as compared with the reciprocal of the channel bandwidth which they occupy (i.e. $WT>1$).

Orthogonal $m$-sequences have been successfully used in several communication systems, as for example, the system described by R. W. Sanders in "Digital Telemetry System," Nat. Symp. Space Electronics Telemetry, Paper No. 6.3, September 1959, pages 1–10, and R. M. Jaffe in "Digilock Telemetry System for the Air Force Special Weapon Center's Blue Scout, Jr.," I.R.E. Trans. Space Electronics and Telemetry, vol. Set-8, No. 1, March 1962, pages 44–49. But to date the use of orthogonal $m$-sequences has been restricted to the simplex mode of transmission. This means, that only one sequence at a time occupies a channel of given bandwidth. Such simplex systems display superior performance in, for example, space communications applications where it is desired to transmit information in the presence of large amounts of random noise and where a minimum of energy is available for this purpose. But simplex systems using orthogonal $m$-sequences suffer from the disadvantage of very low bit transmission rates with respect to the channel bandwidth which they require. Hence, in spite of their theoretically advantageous properties, simplex systems using orthogonal $m$-sequences fall far short of achieving the maximum information transmission rate predicted by Shannon for low-noise channels, when such channels have a signal to noise ratio of 0 db or better.

The present invention provides means for utilizing the properties of orthogonal $m$-sequences so as to achieve bit transmission rates which more closely approach Shannon's theoretical upper limit. More particularly, the present invention sets forth apparatus for the multiplex transmission of orthogonal $m$-sequences.

GENERAL DESCRIPTION

The present invention provides for multiplex transmission by linearly superposing orthogonal $m$-sequences in the transmission channel. This requires that two conditions be met:

(1) All the sequences to be superposed must start and end simultaneously.

(2) The superposition must be linear. This means that the elements of the sequence resulting from the superposition will not be binary elements, but, depending on the information input, either $n$-ary, $(n+1)$ ary ($n$=number of orthogonal sequences) or analog amplitude modulated samples. The transmission channel must be able to handle these higher order samples.

Figure 2:
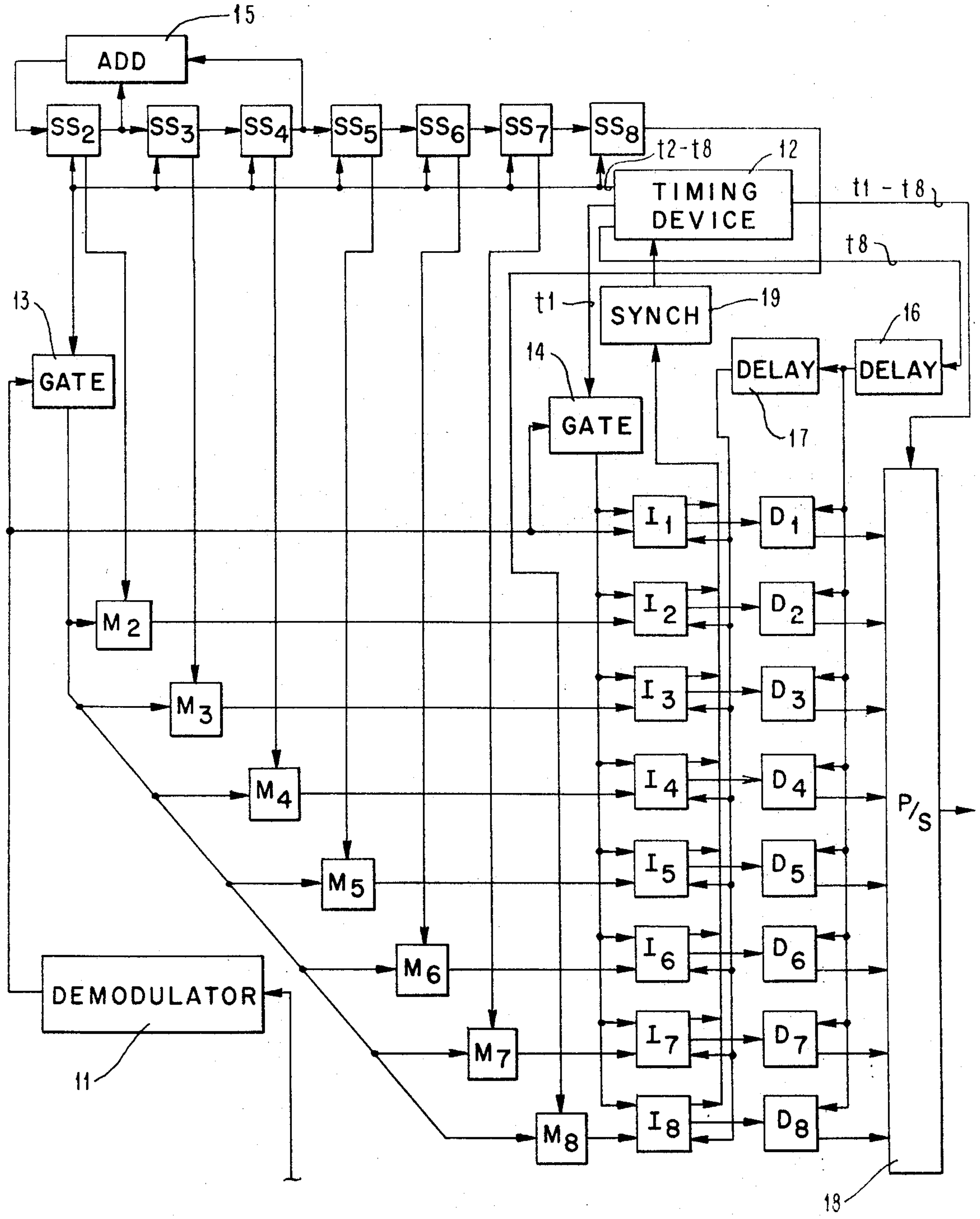
FIG. 2 is a detailed block diagram of the receiving station of my digital communication system.

FIGS. 1 and 2 show the transmitting and receiving stations of a binary digital transmission system using orthogonal $m$-sequences as transmission signals. In FIG. 1, the encoder, which may be called the multi-coder, serves to take a large number of input bits, multiply all simultaneously with a large number of orthogonal binary sequences and deliver during each time slot an $m$-ary output signal to the channel. This signal can be transmitted in any convenient way for $m$-ary signals, for example, as a word over a pulse code modulated (PCM) channel, or as one signal of an orthogonal simplex system or as one signal of an $m$-ary multi-state system. The receiving station shown in FIG. 2 uses a multi-decoder (matched filter bank or set of cross-correlators) along with apparatus for complementary operations, such as demodulation, etc.

Figure 5:
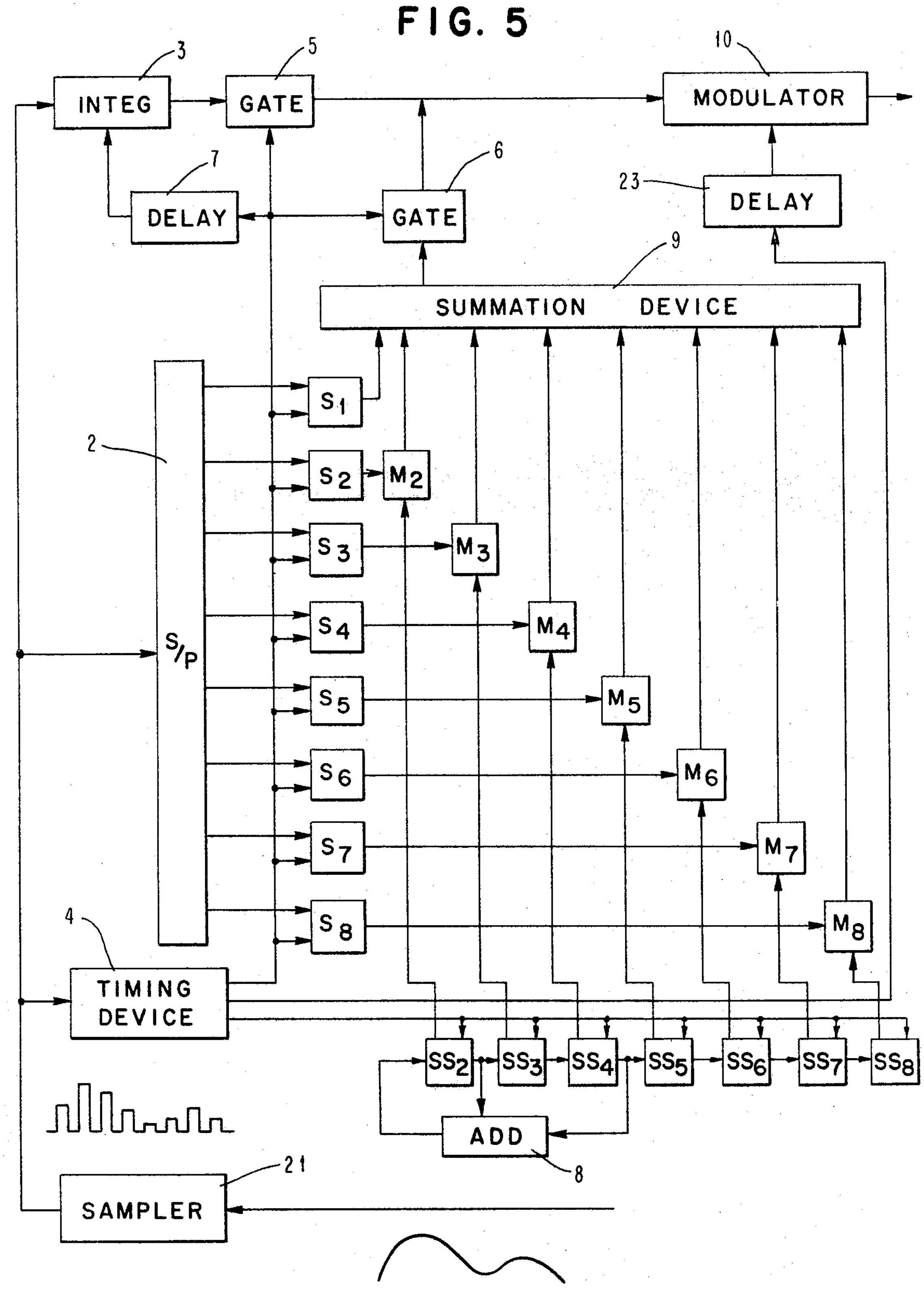
FIG. 5 is a detailed block diagram of the transmitting station of a sampled analog data communication system according to my invention.
Figure 6:
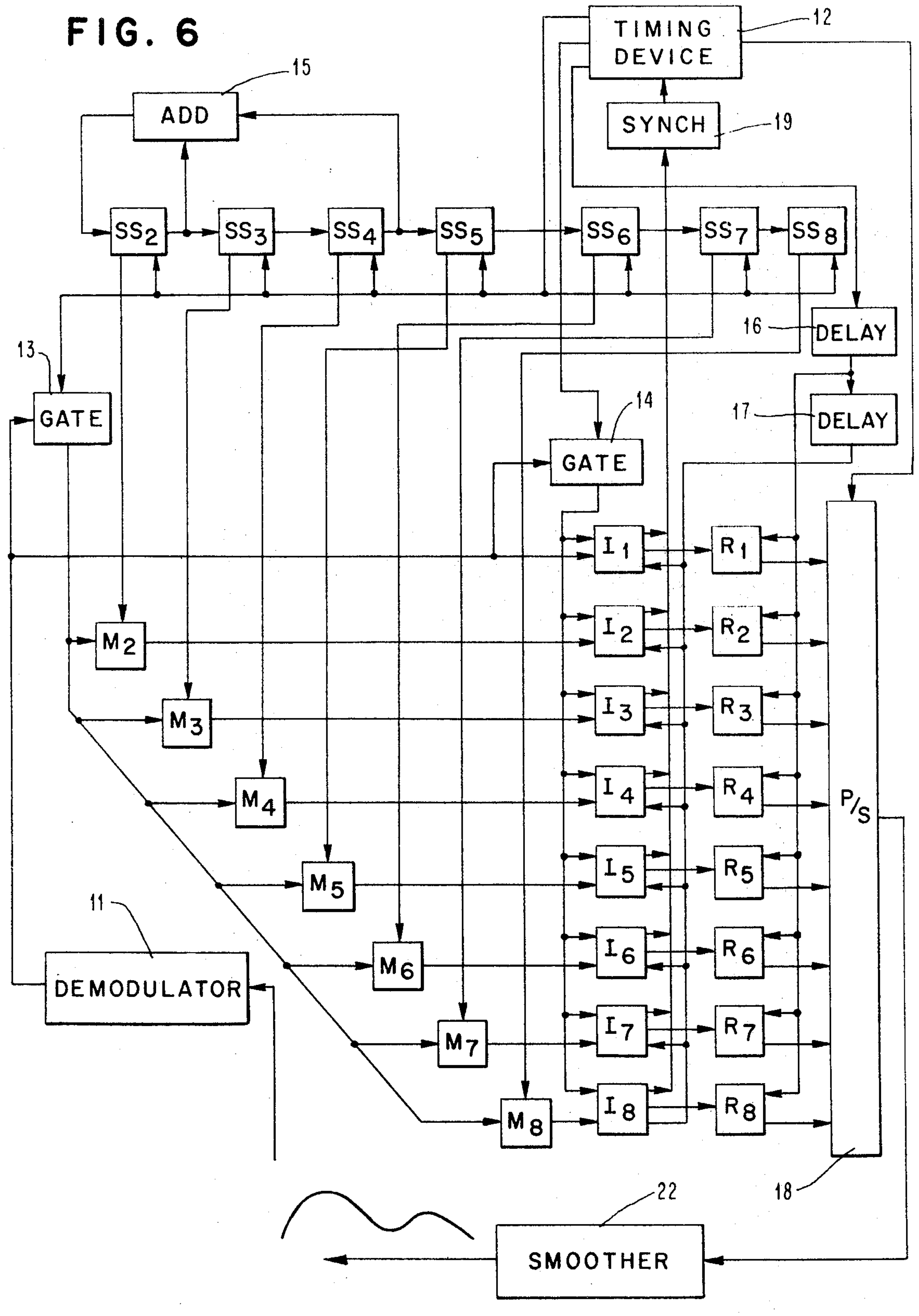
FIG. 6 is a detailed block diagram of the receiving station of a sampled analog communications system according to my invention.

FIGS. 5 and 6 show a sampled data transmission system for transmitting analog information, where the "mesage" is sampled in a conventional way and a large number of samples are simultaneously used in the multi-coder to multiply an equal number of orthogonal binary $m$-sequences. The output of the multi-coder is another set of equal number of pulse amplitude modulated (PAM) samples which may be transmitted by means of a suitable modulation scheme such as pulse position modulation (PPM) for example. The receiver shown in FIG. 6 includes the demodulator and multi-decoder.

Both the binary digital transmission system and the sampled data transmission system have in common that the multi-coder spreads the information of each input element within any given time interval over the length of an entire orthogonal sequence. More specifically, any digit of the binary input to the transmitting station shown in FIG. 1 contributes a little to each one of the PAM samples leaving the multi-coder during that particular transmission interval. This kind of "smearing" action provides that none of the information elements in this smeared form (encoded) is particularly vulnerable to instantaneous disturbances (errors) in the transmission channel. The effect of pulsive noise within the channel is therefore spread thinly, by the action of the multi-decoder at the receiver, over a large number of output elements and thus rendered less harmful. This advantage of "smearing" of the input information will increase with the length of sequences. The actual transmission rate however will remain the same as the rate of the uncoded input, provided a multi-state $m$-ary modulation scheme is used. This is in contrast to the use of orthogonal $m$-sequences in simplex operation, where the transmission rate decreases rapidly with the increase of the length of the orthogonal sequences.

In addition to the advantage against impulsive noise, multi-orthogonal encoding possesses certain characteristics which are particularly advantageous to us in combination with redundancy reducing techniques. In general these characteristics result from the fact that the total energy of each superposed set of orthogonal sequences is equal to the sum of the energies of all of the individual sequences participating during a particular transmission cycle. If, due to the design of the transmission system, the total signal energy for each transmission cycle remains constant, and if the binary (or sample data) input has been processed by a redundancy reducing technique so as to maximize the number of "0's" (non-participating waveforms) in the input, then it is possible to adjust the energy of the remaining, participating, waveforms in an adaptive way so that they contain the total available energy during each transmission cycle. This means that the participating waveforms, which contain all the input information, are transmitted with higher than normal energy and, hence, greater than normal noise resistance.

Another significant advantage of the multiplex use of orthogonal $m$-sequences as information carriers is the ease with which the transmission rate can be changed merely by using more or less of such sequences. For example, when the situation warrants a decrease in transmission rate, coupled with an increase in detectability, as it would be the case during channel degradation, smaller and smaller numbers of orthogonal sequences would be used in each coding interval with each sequence receiving proportionally more energy resulting finally in a simplex operation. This change in the mode of operation does not require any switching action, and still preserves the noise-like character of the signals. The transmission rate can also be changed by changing the length of the orthogonal $m$-sequences. Longer sequences are used in order to increase the immunity of the system to noise. Shorter sequences are used to obtain maximum transmission rates when a noise-free transmission channel is available. Thus it is seen that my system is well suited for variable rate transmission. These and other features of my transmission system are set forth in greater detail below.

DETAILED DESCRIPTION

Referring to FIG. 1, a detailed block diagram of the preferred form of the multi-coder is shown. Binary input data arrives in serial fashion on line 1. Although the binary input data arrives continuously, it is convenient to consider segments of $n$ bits for purposes of illustrating the structure and operation of the subject invention. More particularly, the following discussion will consider the operation of the present invention in terms of segments of 8 bits of binary input data.

The binary input data from line 1 are entered into serial to parallel converter 2 where they are stored temporarily until a full data word of 8 bits has been collected. While the collection of the 8 bits takes place in the serial to parallel converter 2, all 8 input bits are linearly superposed and stored in integrator 3. The timing device 4 derives its clocking rate from the incoming data to produce a properly synchronized series of eight equally spaced timing pulses $t_1$–$t_8$ for controlling the operation of the multi-coder.

When a complete data word of 8 bits has been collected in the serial to parallel converter 2, the timing device 4 produces an output pulse $t_1$ which serves to open the gate 5 so as to release the signal stored in integrator 3. This signal, which represents the positive sum of all 8 input bits, forms the first sample for transmission. This sample is represented symbolically by the first column in the signal matrix shown in FIG. 4.

Timing pulse $t_1$ also serves to render gate 6 nonconducting for the duration of one sample time so as to prevent any interference with the transmission of the sample released from integrator 3. In addition, timing pulse $t_1$ acts through delay element 7 to discharge integrator 3 so as to prepare it for receiving the next 8 bits of input data. For this purpose, delay element 7 should delay timing pulse $t_1$ slightly less than one sample duration in order that the discharge of the integrator can be accomplished before the arrival of the next bit from input line 1.

Timing pulse $t_1$ also serves to transfer the 8 bit data word from serial to parallel converter 2 to the storage devices $S_1$ through $S_8$. This permits the next 8 bit data word to be collected in serial to parallel converter 2 while the data bits stored in storage devices $S_1$ through $S_8$ are encoded for transmission. At this point in time, for reasons which will become apparent, the shift register pseudonoise sequence generator is loaded with a pattern of bits corresponding to the last column of the signal matrix shown in FIG. 4 omitting the top bit. The seven stages of the shift register PN sequence generator are designated $SS_2$ through $SS_7$ to indicate that, at any point in time, the bit contained in the stage $SS_2$ corresponds to an element of the second code word as shown in the second row of the signal matrix shown in FIG. 4. The bit stored in stage $SS_3$ always corresponds to a code element of the third code word and so on.

Each timing pulse $t_2$ through $t_8$ from timing device 4 serves to shift the bits stored in stages $SS_2$ through $SS_8$ one position to the right so that stage $SS_3$ receives the bit previously stored in stage $SS_2$, stage $SS_4$ receives the bit previously stored in stage $SS_3$, and so on. The new bit stored in stage $SS_2$ is formed in adder 8 by the modulo 2 addition of the previous bits stored in stages $SS_2$ and $SS_4$. It must be noted that the present invention is not limited to any specific means for generating the new bits stored in stage $SS_2$. For example, it will be apparent to one skilled in the art that the new bits stored in stage $SS_2$ might be generated by adding the previous contents of stages other than $SS_2$ and $SS_4$. Also, the contents of three or more stages might be added in order to form the new bits stored in stage $SS_2$. The important factor is that the sequence of bits entered into stage $SS_2$ is of a pseudo-random character. The choice of a particular means of generating the new bits for stage $SS_2$ will be dictated by such considerations as the desired length of the pseudo-random sequence before repetition begins. This in turn will be determined by the requirements of each particular application of the present invention.

After the shift initiated by timing pulse $t_2$, the shift register contains a pattern of bits corresponding to the second column of the signal matrix shown in FIG. 4, omitting again the top bit. After the shift operation the contents of shift register stages $SS_2$ through $SS_8$ are multiplied with the contents of their corresponding input storage circuits $S_2$ through $S_8$ by means of multipliers $M_2$ through $M_8$. The resulting products are summed in summation network 9 together with the contents of input storage circuit $S_1$. The resulting composite signal is sampled, after a short delay in summation circuit 9 and the composite sample passes through gate 6 to form the second composite sample in the train of samples to be modulated. At this point timing pulse $t_3$ causes the shift register to shift again. The new contents of the shift register stages are multiplied with the contents of their corresponding input storage circuits, and the resulting products summed, sampled, and passed through gate 6 so as to form the third composite sample in the train of samples to be modulated. This operation is repeated for samples $t_4$ through $t_8$ so as to complete the full train of 8 composite samples of various amplitudes. At this point the contents of the shift register again correspond to the last column of the coding matrix shown in FIG. 3, and the shift register pauses for one sampling interval ($t_1$).

It is noted that the number of composite samples is determined by the number of timing pulses generated by timing device 4, but it should be apparent to those skilled in the art that the number of composite samples need not necessarily correspond to the number of input bits encoded. On the one hand, when transmission channel noise is a problem, it may be desirable to use more composite samples, i.e. longer sequences, for better protection against errors. On the other hand, if an exceptionally noise-free channel is available, it may be advantageous to use fewer composite samples, i.e. shorter sequences in order to attain maximum bit transmission rates. The present example of eight composite samples for eight input bits was chosen merely for purposes of illustration.

As they appear at the outputs of gates 5 and 6 the composite samples are modulated in modulator 10 and transmitted over the transmission channel under control of timing pulses $t_1$–$t_8$ acting through short delay 23 which compensates for the inherent delays of the shift register $SS_2$–$SS_8$, multipliers $M_2$–$M_8$, summation device 9, and gate 6.

While the foregoing shifting, multiplying, and summing operations were being carried out, the next segment of 8 bits of input data were being collected in serial to parallel converter 2 and integrated in integrator 3. At this point timing pulse $t_1$ appears again to initiate the transfer of the 8 bit data word from serial to parallel converter 2 to input storage devices $S_1$ through $S_8$. The contents of integrator 3 are passed through gate 5, and the whole process of shifting, multiplying, and summing is repeated for the new 8 bit data word stored in input storage devices $S_1$ through $S_8$.

The modulator 10 may be of any type known to those skilled in the art. The choice of a particular modulator will depend upon the requirements of each particular application of the present invention. For example, amplitude modulation, frequency modulation, or pulse-code modulation might be used. What is essential is that information defining the heights of the various pulses is transmitted over the transmission channel.

At the receiving station, the signals received from the transmission channel are demodulated and decoded in order to recover the original input information presented to the transmitting station. FIG. 2 shows a detailed block diagram of the receiving station. Demodulator 11 receives signals from the transmission channel and demodulates them so as to produce a train of samples of varying amplitudes corresponding as nearly as possible in view of channel noise conditions to the train of composite samples presented to the modulator 10 at the transmitting station.

Timing device 12 serves to produce a train of 8 equally spaced timing pulses $t_1$ through $t_8$ during each transmission cycle. These timing pulses are synchronized to the output samples from demodulator 11 in a manner which will be explained below. During the arrival of the first sample, gate 13 is nonconducting, but gate 14 is made to conduct by timing pulse $t_1$. Hence, the first sample is loaded into each of the integrators $I_1$ through $I_8$. At this point, the shift register stages $SS_2$ through $SS_8$ are loaded with a pattern of bits corresponding to the last column in the signal matrix shown in FIG. 4. When the second sample appears at the output of demodulator 11, timing pulse $t_2$ serves to shift the contents of the shift register stages $SS_2$ through $SS_8$ one position to the right. Hence, the contents of stage $SS_2$ become the new contents of stage $SS_3$, the contents of stage $SS_3$ become the new contents of stage $SS_4$, etc. The new contents of stage $SS_2$ is formed by the modulo 2 addition in adder 15 of the previous contents of stages $SS_2$ and $SS_4$. Because the shift register at the receiving station is loaded initially with the same pattern of bits as the initial loading of the shift register at the transmitting station, and because the successive new contents of stage $SS_2$ are generated in exactly the same way, the successive patterns of bits stored in stages $SS_2$ through $SS_8$ of the shift register at the receiving station will be identical to the patterns of bits stored in the stages $SS_2$ through $SS_8$ of the shift register at the transmitting station. This operation results in the formation at multipliers $M_2$–$M_8$ of the binary sequences, less their first element, corresponding to the second to last row in FIG. 4. The first element of all sequences in FIG. 4 is a positive element and, accordingly, the first sample can be directly inserted into all integrators without the use of a multiplier, as explained above.

The second sample from demodulator 11 must be applied to the multipliers $M_2$ through $M_8$. For this purpose timing pulse $t_2$ serves to open gate 13. During the shift operation the new contents of shift register stages $SS_2$ through $SS_8$ are applied to the other inputs of multipliers $M_2$ through $M_8$ respectively. The resulting products which appear at the outputs of multipliers $M_2$ through $M_8$ are applied to integrators $I_2$ through $I_8$.

Timing pulse $t_3$ initiates another shift operation, at the end of which the contents of shift register stages $SS_2$ through $SS_8$ correspond to the third column of the signal matrix shown in FIG. 3. Timing pulse $t_3$ also serves to open gate 13 so as to admit the third sample appearing at the output of demodulator 11 to the inputs of multipliers $M_2$ through $M_8$. Multiplication with the contents of the corresponding shift register stages again takes place, and the resulting products are again applied to integrators $I_2$ through $I_8$. This operation proceeds through timing pulse $t_8$ at which point the full segment of 8 samples from the modulator 11 has been processed through multipliers $M_2$ through $M_8$ and applied to integrators $I_2$ through $I_8$. At this point the contents of the shift register stages $SS_2$ through $SS_8$ again correspond to the last column of the signal matrix shown in FIG. 4. Further, it will be noted that during the above-described operations, integrator $I_1$ has received and integrated all of the samples appearing at the output of demodulator 11.

At this point timing pulse $t_8$, acting through delay element 16, causes decision devices $D_1$ through $D_8$ to sample the contents of integrators $I_1$ through $I_8$. If the contents of a particular integrator exceeds a certain threshold value, the corresponding decision device will produce a positive output. If the contents of the integrator do not exceed the threshold value, the decision device will produce the complementary output. The precise threshold values involved, and the particular types of decision devices employed will depend upon the mode of operation of the present invention. The various modes of operation will be discussed below.

After activating decision devices $D_1$ through $D_8$, timing pulse $t_8$ acts through an additional short delay 17 to clear integrators $I_1$ through $I_8$ so as to prepare them to receive the product signals resulting from the next 8 samples appearing at the output of demodulator 11. It will be apparent to those skilled in the art that delays 13 and 14 must be sufficiently short that the decision devices $D_1$ through $D_8$ can be actuated, and integrators $I_1$ through $I_8$ can be cleared during the time interval between the arrival of the last sample of one segment of 8 samples from demodulator 11 and the first sample of the next segment.

The output from deciders $D_1$ through $D_8$ are received by parallel to serial converter 18. In response to clocking pulses $t_1$ through $t_8$ from timing device 12, parallel to serial converter 18 serves to convert the information from deciders $D_1$ through $D_8$ into a serial output. It will be appreciated by those skilled in the art that although the present invention has been described in the context of a serial to serial or simplex data communications systems, the present invention might equally well be applied to a parallel to parallel or multiplexed data communications system. This would be accomplished simply by removing serial to parallel converter 2 at the transmitting station and parallel to serial converter 18 at the receiving station.

MODES OF OPERATION

According to one mode of operation of my digital communication system, the states of each digital input stored in input storage circuits $S_1$ through $S_8$ of FIG. 1 are defined by ground potential and a certain positive potential. This mode of operation may be called the monopolar mode. For example, the signals stored in input storage circuits $S_1$ through $S_8$ of the transmitting station shown in FIG. 1 is either 0 volts or +6 volts. In this instance, the decision devices $D_1$ through $D_8$ at the receiving station shown in FIG. 2 are simply threshold devices having threshold levels set at +3 volts. Hence, if the voltage accumulated in the corresponding integrator $I_1$ through $I_8$ is less than +3 volts, the decision device will produce a "0" output. On the other hand, if the voltage accumulated in the corresponding integrator is greater than +3 volts the decision device will produce a "1" output. This mode of operation is particularly attractive where it is desired to send the composite samples generated by multipliers $M_1$ through $M_8$ and summation device 9 directly over the transmission channel in the form of pulse amplitude modulated pulses.

Another advantage of this mode of operation is found in cases where the binary input applied to the transmitting station is redundant. Several redundancy reducing or digital compacting procedures are available for recording redundant messages in such form that the probability of "0's" is maximized. One of the simplest methods of this kind is "differential encoding" which indicates a change in a particular position of an input data word by placing a "1" in the corresponding position of the encoded word. For example, the code word 0000 signifies "no change," code word 0001 signifies "1," and code word 1111 signifies "full change." My digital communication system is able to make advantage of input messages containing a heavy predominance of "0's" by making available total energy of the system for the transmission of the few "1's" which are presented to the transmitting station. This is accomplished by providing the transmitting station with means for controlling the power per transmitted word in such a way that the total energy per transmitted word remains constant from word to word. For example, the transmitting station is provided with means for sensing the number of "1's" in input circuits $S_1$–$S_8$ during each transmission cycle. The output from the sensing means operates a gain control device so as to increase the gain of modulator 10 by a factor equal to the square root of the number of input circuits divided by the number of "1's" stored in the input circuits during the particular transmission cycle. At the receiving station shown in FIG. 2, provision is made for increasing the threshold level of decision devices $D_1$–$D_8$ by a corresponding factor. Control signals for this purpose can be derived by permanently setting a "1" into one of the input circuits $S_1$ through $S_8$ at the transmitting station as shown in FIG. 1. The magnitude of the voltage collected in the corresponding integrator at the receiving station shown in FIG. 2 can then be used to control the threshold levels of the decision devices $D_1$ through $D_8$.

According to a second mode of operation of my invention, the states of the digital input signals stored in input storage circuits $S_1$ through $S_8$ of FIG. 1 are defined by a certain positive potential and a certain negative potential. This mode of operation may be called the bipolar mode. For example, binary "1" is represented by +6 volts, and binary "0" is represented by −6 volts. In this case the decision devices $D_1$ through $D_8$ at the receiving station shown in FIG. 1 are threshold devices having threshold levels set at 0 volts so that if the voltage collected in the corresponding integrator exceeds 0 volts the decision device will produce a "+1" output, and if the voltage collected in the corresponding integrator is less than 0 volts the decision device will produce a "−1" output. This mode of operation insures that each group of composite examples presented to the transmission channel is of the same energy.

Further, this mode of operation lends itself to an interesting variation wherein the composite samples are pulse-code modulated for transmission. One of the inputs $S_1$ through $S_8$ of FIG. 1 may be left inactive (0 volts) while the remaining inputs carry information in the normal manner. At the receiving station, the voltage collected in the integrator corresponding to the inactive input will act as a "noise window" to give an indication of the amount of noise in the transmission channel. This feature is highly important in feedback communications systems and in variable rate systems.

My communications system is also capable of a ternary mode of operation. According to this mode of operation the possible states of each digital input signal are defined by a certain positive potential, ground potential, and a certain negative potential. The "+1" state might be represented by +6 volts, the "0" state by 0 volts, and the "−1" state by −6 volts. In this case decision devices $D_1$ through $D_8$ at the receiving station shown in FIG. 2 are "null zone" decision devices. Null zone decision devices are well known in the art and are described in D. Hoffman, "Experimental Null-Zone Reception Systems," College of Engineering, New York University, Scientific Report No. 6, January 1958–January 1959, (AD 212, 259) and J. J. Metzner et al., "Null-Zone Envelope Detection in Binary Systems," I.E.E.E. Trans. Commun. Electronics, No. 66, May 1963, pages 219–227. More particularly, the threshold levels of decision devices $D_1$ through $D_8$ are set so that if the voltage collected in the corresponding integrator exceeded, for example, +2 volts then the decision devices would produce a "+1" output. If the voltage collected in the corresponding integrator fell between +2 and −2 volts the decision device would produce a "0" output, and, if the voltage collected from the corresponding integrator is below −2 volts, the decision device will produce a "−1" output.

In a variation of the ternary mode of operation, input storage circuit $S_1$ through $S_8$ of FIG. 1 normally contain information in the form of positive or negative voltages, but, when there is no information for a particular terminal, a zero voltage is delivered which suppresses the corresponding code sequence entirely. This variation is important for digital communications systems having asynchronous input rates, for redundancy reducing input encoding, and for variable rate systems where the transmitted energy per bit can be controlled in response to the error rate at the receiving station.

EXAMPLES OF OPERATION

Perhaps the principles of operation of my invention may be best understood by reference to examples of the transmission of typical sets of input bits by typical communication systems utilizing my invention. For instance, referring to the transmitting station shown in FIG. 1, let us assume that the typical set of binary input bits on line 1 are 01011011. Serial to parallel converter 2 serves to distribute these binary input bits to input storage circuits $S_1$–$S_8$. Further, let us assume the bipolar mode of operation wherein binary "1" is represented by +1 volt, and a binary "0" by −1 volt, in each of the input storage circuits $S_1$–$S_8$. Therefore, the typical set of input bits will be represented by the set of voltages shown in FIG. 7*a*.

During the distribution of the input bits to the input storage circuits $S_1$–$S_8$, all of the input bits have been linearly superposed in integrator 3 as indicated by column $t_1$ of FIG. 7*b*. At time $t_1$ the contents of integrator 3 are released through gate 5 to form the first composite sample. In this case, the first composite sample has a value of +2 volts as indicated by the first figure in FIG. 7*c*.

At time $t_2$ the contents of input storage circuits $S_2$–$S_8$ are multiplied with the contents of shift register stages $SS_2$–$SS_8$ by means of multipliers $M_2$–$M_8$ so as to form the set of product voltages shown in column $t_2$ in FIG. 7*b*. For this purpose multipliers $M_2$–$M_8$ are simply polarity inverters. These product voltages are summed together with the contents of input storage circuit $S_1$ to form the second composite sample for transmission. In this case, the second composite sample is −2 volts as indicated by the second figure in FIG. 7*c*. Timing pulse $t_3$ steps the shift register, and the multiplication and summation are repeated so as to form the third composite sample, etc., until the entire set of eight composite samples have been generated. The values of the eight composite samples are shown in FIG. 7*c*. As each composite sample is generated, it is modulated and sent out over the transmission channel by modulator 10 under control of timing pulses $t_1$–$t_8$ from timing device 4.

For purposes of illustrating the resistance of my communication system to pulsive noise, let us assume that the fifth composite sample is wiped out by a noise pulse. In this case, the values of the composite samples which appear at the output of demodulator 11 of the receiving station shown in FIG. 2 are represented by the figures in FIG. 7*d*. Note that the fifth composite sample has a value of 0 volts rather than the correct value of −2 volts as shown in FIG. 7*c*.

At time $t_1$, a pulse from timing device 12 opens gate 14 so as to apply the first composite sample from demodulator 11 to each of the integrators $I_1$–$I_8$ at the receiving station shown in FIG. 2. This operation is represented by column $t_1$ in FIG. 7*e*. At time $t_2$, a pulse from timing device 12 steps the shift register and opens gate 13 so as to multiply the second composite sample from demodulator 11 with the contents of shift register stages $SS_2$–$SS_8$ in multipliers $M_2$–$M_8$. The resulting products are represented by column $t_2$ of FIG. 7*e*. At time $t_3$, the shift register is again stepped, gate 13 opened, and the third composite sample multiplied with the contents of shift register stages $SS_2$–$SS_8$, etc., until the entire set of eight composite samples has been processed. Integrator $I_1$, receives all samples without any change in polarity as illustrated by the top line in FIG. 7*e*. It simply measures the arithmetic mean value of all eight samples. The products of multipliers $M_2$–$M_8$ during each step of the process are represented by the remaining figures shown in FIG. 7*e*. After the processing of the eighth composite sample, integrators $I_1$–$I_8$ will contain the voltages shown in FIG. 7*f*.

Timing pulse $t_8$ acts through a short delay 16 to cause decision devices $D_1$–$D_8$ to sample the contents of integrators $I_1$–$I_8$. In the example given decision devices $D_1$–$D_8$ may be simple threshold devices having their threshold levels set at ground potential. If the voltage stored in the corresponding integrator exceeds ground potential, the decision device will produce a binary "1" output. If the voltage stored in the corresponding integrator is below ground potential, the decision device will produce a binary "0" output. Note that the correct binary output is obtained in spite of the fact that the fifth composite sample was wiped out by a noise pulse.

After the decision devices $D_1$–$D_8$ have sampled the contents of integrators $I_1$–$I_8$, timing pulse $t_8$ acts through an additional short delay 17 to clear integrators $I_1$–$I_8$ for subsequent operations. The outputs of decision devices $D_1$–$D_8$ are delivered to parallel to serial converter 18 which serves to convert the information to serial form during the subsequent cycle of the receiving station shown in FIG. 2.

The principles of operation of my invention may be further illustrated by reference to a second example of the transmission of the same set of input bits as in the first example illustrated by FIG. 7. In this second example, let us assume the monopolar mode of operation wherein a binary "1" is represented by +1 volt, and a binary "0" by 0 volts (rather than −1 volt as in the first example). Hence the set of input voltages stored in input storage circuits $S_1$–$S_8$ of FIG. 1 are represented by the set of voltages shown in FIG. 8*a*.

The contents of input storage circuits $S_2$–$S_8$ are multiplied with the contents of shift register stages $SS_2$–$SS_8$ at times $t_2$–$t_8$. For this purpose multipliers $M_2$–$M_8$ are, once again, simple polarity inverters. The resulting products are shown in FIG. 8*b*. The composite samples formed by summing the products during each time interval $t_2$–$t_8$ are shown in FIG. 8*c*. The different values of the composite samples shown in FIG. 8*c* as compared with FIG. 7*c* are due to the presence of the 0 values in FIG. 8*b*.

The total energy of a set of composite samples is arrived at by squaring the value of each sample and taking the sum of the squares. Note that the total energy of the composite samples shown in FIG. 7*c* has a value of 64 whereas the total energy of the composite samples shown in FIG. 8*c* has a value of only 40.

$$4+4+4+4+4+36+4+4=64 \quad \text{(FIG. 7}c\text{)}$$

$$25+1+1+1+1+9+1+1=40 \quad \text{(FIG. 8}c\text{)}$$

In this second example, modulator 10 may be provided with an automatic gain control device for increasing the value of each of the composite samples so as to bring the total energy up to a value of about 64. As explained above in the section entitled "Modes of Operation," the automatic gain control device would be responsive to a means for sensing the number of "1's" stored in input circuits $S_1$–$S_8$ so as to increase the gain of modulator 10 by a factor equal to the square root of the total number of input circuits divided by the number of "1's" stored in input circuits $S_1$–$S_8$ during each particular transmission cycle. For this example the gain factor is $\sqrt{8/5}=1.28$. FIG. 8*d* shows the enlarged values of the composite samples.

Due to the increase in signal strength it is possible to introduce more noise in the transmission channel without creating errors at the output. Assuming that, during the transmission of the composite samples shown in FIG. 8*d*, the second, third, fourth, and fifth samples are hit by noise pulses of one unit each, the output of demodulator 11 of the receiving station shown in FIG. 2 would be represented by the values shown in FIG. 8*e*. The multiplication at times $t_2$–$t_8$ of the composite samples shown in FIG. 8*e* with the contents of shift register stages $SS_2$–$SS_8$ of the receiving station shown in FIG. 2 yields the product voltages shown in FIG. 8*f*. FIG 8*g* shows the voltages accumulated in integrators $I_1$–$I_8$ at the end of the decoding process. Since under noise-free conditions, a particular integrator would be expected to contain $$1.28\times 8=+10.24$$

volts for a "1" message element, and 0 volts for a "0" message element, the threshold levels of decision devices $D_1$–$D_8$ should be set at +5.12 volts which is just halfway between the two values. FIG. 8*h* shows that with the +5.12 volt threshold level, all digits are decoded correctly in spite of the noise introduced in the transmission channel.

SYNCHRONIZATION TECHNIQUES

In my communication system, synchronization of the transmitting station and the receiving station is necessary in order to permit proper decoding of the received information. More particularly, the shift register at the receiving station as shown in FIG. 2 must be properly synchronized in order that each sample which appears at the output of demodulator 11 is multiplied by the proper shift register sequence. Further, the sampling of the contents of integrators $I_1$ through $I_8$ by decision devices $D_1$–$D_8$ must be precisely timed at the end of the processing of each group of eight samples from demodulator 11. The present invention permits sychronization to be accomplished in a number of ways. One way that the synchronization may be accomplished is to reserve one of the input circuits for purposes of synchronization. This input circuit will permanently contain a signal representing, for example, binary "1." In this case the integrator at the receiving station corresponding to this input circuit will reach a high voltage peak, known as an auto-correlation peak, at the end of each and every group of eight samples which appear at the output of demodulator 11. The appearance of this high voltage peak at the end of each transmission cycle is used to synchronize timing device 12 for proper operation of the receiving station.

It may happen that intermediate voltage peaks build up in the synchronizing integrator due to interactions with the transmitted data. If these intermediate cross-correlation peaks should approach the magnitude of the auto-correlation peak, there is a danger that synchronization will be lost. In this case the voltage stored in the input circuit reserved for synchronization is increased. This increases the size of the auto-correlation peak in relation to the size of intermediate cross-correlation peaks so as to enable the auto-correlation peak to be more easily distinguished.

Another method for avoiding the confusion due to intermediate cross-correlation peaks is to employ a combination of input circuits for purposes of synchronization. In accordance with this technique the contents of a combination of the input circuits $S_1$ through $S_8$ of FIG. 1 are permanently set, for example, to the binary "1" condition. At the receiving station, the voltages collected in the integrators corresponding to this combination of input circuits are sensed. High auto-correlation peaks occur simultaneously in all of these integrators just after the arrival of the last sample from demodulator 11 during each transmission cycle. Intermediate cross-correlation peaks will not coincide. Therefore synchronization of timing device 13 is derived from the coincidence of high voltage peaks in all of the integrators of the selected combination.

It also may happen that, in starting a communication system utilizing my invention, the shift register at the receiving station may be out-of-phase with the shift register at the transmitting station. In this situation it is possible that some repetitive cross-correlation peaks could be generated in the multi-decoder at the receiving station shown in FIG. 2. Synchronizing device 19, in applying one of the above-described synchronization techniques, might mistake these cross-correlation peaks for auto-correlation peaks, and thus acquire an erroneous synchronization lock. Therefore it may be desirable to provide an additional means for discriminating between spurious cross-correlation peaks and true auto-correlation peaks. This can be accomplished by alternating the polarity of the voltage stored in one or more of the input circuits $S_1$–$S_8$ of FIG. 1 which have been reserved for synchronization. In addition synchronizing device 19 of FIG. 2 will contain a filter or logic circuit which is sensitive to this alteration so that, if synchronizing device 19 locks on a cross-correlation peak, the alternation will not be sensed, and timing device 12 will be stepped to another phase until the true auto-correlation peak is sensed. Circuits of this type are well known to those skilled in the art as, for example:

J. J. Stiffler, "Synchronization for Telemetry Codes," I.R.E. Trans. Space Electronics and Telemetry, vol. SET–8, No. 2, June 1962, pp. 112–117.

J H. Van Horn: "A Theoretrical Synchronization System for Use With Noisy Digital Signals," I.E.E.E. Trans. Commun. Techn., vol. COM–12, No. 3, September 1964, pp. 82–90. For additional protection, the alternation can be made to take place in specially coded rhythm in order to make the synchronization of the communications system particularly insensitive to disturbances.

A further possibility would be to use the input circuit reserved for synchronization as a separate analog subchannel. According to this technique, the voltage stored in the input storage circuit would be modulated with a characteristic analog signal such as, for example, a sine wave of a frequency less than one-half the repetition rate of the orthogonal binary sequences. Synchronization device 19 of FIG. 2 will then contain a filter which is tuned to such a modulating signal superimposed on the synchronization sequence. If the timing device 12 at the receiving station shown in FIG. 2 is out-of-phase with the timing device 4 at the transmitting station shown in FIG. 1, the signal from synchronizing device 19 will be very small. When the receiving station and the transmitting station are in phase the signal from synchronizing device 19 will be at its maximum.

The complexity of the particular synchronization technique employed depends upon the particular communication problem to be solved. The greater the complexity of the synchronization technique, the less vulnerable the communications system will be to wrong acquisition of synch and to losing synch during periods of fading signal strength. On the other hand, a complex synchronization technique will require a longer search period in order to acquire and secure synchronization.

Each of the above synchronization techniques uses up a part of the information carrying capacity of my digital communications system. The advantages of synchronization techniques which do not use up information carrying capacity are apparent. One such technique involves the clipping of the high voltage peaks which occur in integrators $I_1$ through $I_8$ at the receiving station shown in FIG. 2. More particularly, means are provided for sensing the voltage levels collected in integrators $I_1$ through $I_8$ and clipping the highest voltage peaks. The clipping level is set somewhat higher then the average level of the intermediate cross-correlation peaks which may occur. The result is that only the auto-correlation peaks will be periodically repeated while the cross-correlation peaks will change their position with changing messages. The output from the clipping circuit can be filtered, integrated and then used to synchronize timing device 12 or to step it to another phase until periodically repeating pulses are sensed.

According to another method for synchronizing the present digital communications system, a summation device shown as synch 19 in FIG. 2 responsive to the voltage levels collected in integrators $I_1$ through $I_8$ will produce an output signal corresponding to the absolute sum of these voltages. When the output signal from the summation device exceeds a certain threshold level the synchronizing signal for synchronizing timing device 12 is generated by synch 19. The threshold level is set so that it may be exceeded only when one or more auto-correlation peaks occur in integrators $I_1$ through $I_8$. When operating in this mode of synchronization, the timing device 12 at the receiving station shown in FIG. 2 operates at a repetition rate slightly different from the one of the timing device 4 at the transmitting station shown in FIG. 1. When sensing the maximum output of synchronizing device 19 the timing device 12 will lock on.

It will be apparent to those skilled in the art that it might be desirable to employ a combination of the above synchronizing techniques in a single communications system. For example, a technique utilizing one or more of the input circuits $S_1$ through $S_8$ at the transmitting station might be desirable for the purpose of acquiring synchronization between the transmitting station and the receiving station. On the other hand, one of the synchronization techniques which does not use up the information carrying capacity of the system would be more advantageous for maintaining synchronization, once acquired.

EXAMPLES OF SYNCHRONIZATION

The characteristics of some of the above-described synchronization techniques may best be explained by reference to specific numerical examples. For instance, FIG. 9*a* shows the same input message as has been used in the first example FIG. 7*a*. FIG. 9*b* shows the received and decoded message assuming a noisefree and errorfree transmission.

If we now assume that the receiver timer 12 should be out of step for one shift register step and if we further assume that the message might be stationary, i.e., it would not change for many cycles of the shift register sequence then we would receive the wrong message shown in column $\Delta_1$ of FIG. 9*c*. Similarly column $\Delta_2$ indicates the wrong message for a phase difference of two steps and so on until column $\Delta_8$ is again the correct message for a full cycle phase difference. The two encircled values are instances where a channel delivers at a wrong phase a higher output than the correct output.

Assume now that input storage circuit $S_4$ at the transmitting station shown in FIG. 1 is selected as the synchronization channel and that its contents are held at a constant voltage level to serve as a synchronization signal. Doubling the voltage stored in input circuit $S_4$ as shown in FIG. 9*d* still leaves a higher cross-correlation peak as shown in FIG. 9*e*. Indeed, in this special case one has to increase the level of the synchronization channel to +4 to bring the auto-correlation peak to +32 as against a value of +28 for the cross-correlation peak as shown in FIGS. 9*f* and 9*g*. Naturally this is a particularly unfortunate case and examples with very short sequences ($n=8$ in this case) do not display the good statistical characteristics of longer sequences.

The example in FIG. 9 can also be used to show the advantage of modulating the synchronization channel. Assume that the contents of input circuit $S_4$ in FIG. 9*a* would alternate between +1 and −1 from one frame to the next, It is then evident that the misleading cross-correlation peak would only alternate from +16 to +18 while the correct auto-correlation peak would alternate from +8 to −8. Thus the output of a filter in synchronizing device 19, tuned to this alternating frequency would be twice as high at the correct phase than at the wrong phase.

Another example illustrated in FIG. 10 shows the advantage of a method which does not require a special synchronization channel. To avoid any special pattern which may occur with smaller sequences, a sequence of 16 elements has been used for purposes of illustration. A bipolar message of +1 and −1 values is assumed at the input to the system. It is also assumed that the 16th input is kept at zero level in order to use this channel as a "noise window" as explained above in the section entitled "modes of operation." FIG. 10 shows in column $\Delta_{16}$ a typical noisefree received message. The values +16 correspond to the +1 message element and the values −16 to the −1 message element. These are therefore the correct auto-correlation values if the receiver is in phase with the transmitter. In columns $\Delta_1$ to $\Delta_{15}$ are the cross-correlation coefficients which result when the shift register at the receiving station shown in FIG. 2 is out of of step for 1 to 15 steps respectively all message elements remaining stationary. It can be seen that every channel has at least one cross-correlation peak higher than the auto-correlation peak, thus rendering undesirable any synchronization mode based on the auto-correlation peak alone. However, the last line of FIG. 10 shows the interesting fact that the sum of the absolute values of all outputs is highest (240) at the correct phase, while it is smallest when the system is out of phase for many steps. This means that a synchronization mode based on a measurement of the sum of the absolute value of all outputs will be advantageous in this case of a bipolar binary system.

SAMPLED ANALOG DATA SYSTEM

While the foregoing description has been directed to digital data communications systems, the principles of the present invention may also be applied to sampled analog data systems. For example, FIG. 5 shows a sampled analog data system wherein the input signal on line 1 is in the form of a continuous analog wave form. Sampler 21 samples the analog wave form and produces an output consisting of amplitude modulated samples. These amplitude modulated samples are converted from serial to parallel form by serial to parallel converter 2. When a full segment or word, for example, of eight amplitude modulated samples, has been collected in serial to parallel converter 2, the samples are transferred to input storage circuits $S_1$ through $S_8$. For this purpose input storage circuits $S_1$ through $S_8$ must be analog storage devices capable of accurately storing analog samples of varying amplitudes.

The encoding of the amplitude modulated samples proceeds in the same manner as the encoding of the binary input signals of the digital communications system described above. The successive patterns of bits stored in shift register stages $SS_2$ through $SS_7$ are multiplied with the amplitude samples in multipliers $M_2$ through $M_8$, and the resulting products are summed by summation device 9 so as to produce a train of eight composite amplitude samples. The composite samples are modulated, transmitted, and demodulated at the receiving station. The composite samples which appear at the output of demodulator 11 are processed in the same manner as in the digital communications system described above except that, in the sampled analog data system, no decision devices are employed at the receiving station. Instead, the voltage levels collected in integrators $I_1$ through $I_8$ are simply resampled by resamplers $R_1$ through $R_8$ at the end of the processing of each eight composite samples which appear at the output of demodulator 11. The outputs of resamplers $R_1$ through $R_8$ are applied to parallel to serial converter 18 which converts them into a serial stream of amplitude modulated samples. The stream of amplitude modulated samples passes through smoother 22 which serves to restore the received analog wave form.

Sampled analog data communications systems employing my invention possess certain advantages over the prior art sampled analog data communications systems. For example, sampled analog data communications systems employing my invention are inherently resistive to the effects of pulsive noise. This characteristic is due to the "smearing" effect produced by the encoding procedure, the destruction of one of the composite samples by pulsive noise will merely degrade, but not destroy any particular data sample.

Another advantage for sampled data communication systems resides in the redundancy reducing capabilities of the present invention. In many sampled data communication systems, such as telemetry or telecontrol systems, the input wave forms will have high redundancy in the sense that for some time intervals the input wave form will change very little while, for other intervals, fast and sizable perturbations will occur. If the number of samples which can be handled by the coding matrix is sufficiently large that several such periods of alternating complexity of the input wave form are represented, redundancy reducing techniques may be advantageously used to suppress the redundant (nearly identical) samples. Accordingly, several of the input storage devices at the transmitting station will be in the "0" condition during each transmission cycle. Therefore the full available energy of the communications system can be devoted to transmitting the information contained in the remaining, nonzero input storage circuits, in accordance with the energy sharing procedure described above, because of the randomizing action of the encoding procedure of the present invention, the vital information describing the fast and sizeable perturbations of the analog input wave form is spread over many composite transmission samples. Thus an efficient trade off between the redundancy reduction of the input information and the full use of the inherent redundancy of my sampled data transmission system is achieved.

While my invention has been shown and described with reference to several particular embodiments and examples of operation, it will be understood by those skilled in the art that changes in form and details may be made therein without departing from the spirit and scope of the invention.

I claim:

1. A digital communication system including, a transmitting station and a receiving station connected by a transmission channel;

said transmitting station comprising:

$n+1$ input circuits for receiving and storing $n+1$ successive digital input signals during each cycle of operation;

an integrator for linearly superposing the digital input signals stored in said input circuits;

an $n$-stage binary shift register PN sequence generator;

$n$ multipliers for multiplying the contents of the $n$ stages of said shift register PN sequence generator with the contents of $n$ corresponding input circuits;

timing means for stepping said shift register PN sequence generator through $m$ steps during each cycle of operation;

a summation device for linearly superposing the outputs from said multipliers and from said remaining input circuit during each step so as to form a train of $m$ composite amplitude samples;

means for sampling the contents of said integrator and adding that sample to said train of $m$ composite amplitude samples so as to form a train of $m+1$ composite amplitude samples for transmission over said transmission channel;

said receiving station comprising:

a first integrator for linearly superposing said $m+1$ composite amplitude samples from said transmission channel;

an $n$ stage binary shift register PN sequence generator identical to said PN sequence generator at said transmitting station;

$n$ multipliers for multiplying each of $m$ of said $m+1$ composite amplitude samples from said transmission channel with the contents of all $n$ stages of said shift register PN sequence generator;

timing means for stepping said shift register PN sequence generator through $m$ steps during each cycle of operation;

further $n$ integrators for integrating the outputs from said multipliers;

means connected to and controlled by said timing means for applying the one of said $m+1$ composite amplitude samples, which is the output of said means for sampling the contents of said integrator in said transmitting station, directly to all said integrators; and $n+1$ decision devices corresponding to said $n+1$ input circuits at said transmitting station, said $n+1$ decision devices being connected to and controlled by the contents of the $n+1$ integrators at said receiving station for producing digital output signals corresponding to the transmitted information.

2. A digital communication system of the type described in claim 1 wherein the possible states of each digital input signal are defined by ground potential and a predetermined positive potential;

and wherein each decision device at said receiving station delivers said predetermined positive potential if the contents of its associated integrator exceed a predetermined threshold level, and ground potential if the contents of said associated integrator do not exceed said predetermined threshold level.

3. A digital communication system of the type described in claim 1 wherein the possible states of each digital input signal are defined by a predetermined positive potential and a predetermined negative potential;

and wherein each decision device at said receiving station delivers said predetermined positive potential if the contents of its associated integrator are more positive than ground potential, and delivers said predetermined potential if the contents of said associated integrator are more negative than ground potential.

4. A digital communication system of the type described in claim 1 wherein the possible states of each digital input signal are defined by a predetermined positive potential, ground potential, and a predetermined negative potential;

and wherein each decision device at said receiving station delivers said predetermined positive potential if the contents of its associated integrator are more positive than a predetermined positive threshold level, and delivers said predetermined negative potential if the contents of its associated integrator are more negative than a predetermined negative threshold level, and delivers ground potential if the content of said associated integrator fall between said positive and negative threshold levels.

5. A digital communication system of the type described in claim 1 wherein the possible states of each digital input signal are defined by a predetermined positive potential and a predetermined negative potential;

and wherein each decision device at said receiving station delivers said predetermined positive potential if the content of its associated integrator are more positive than a predetermined threshold level, and delivers said predetermined negative potential if the content of said associated integrator are more negative than a predetermined negative threshold level, and delivers an error signal if the contents of said associated integrator fall between said predetermined positive and negative threshold.

6. A digital communication system of the type described in claim 1 including synchronizing means for synchronizing the timing means at the transmitting station with the timing means at the receiving station, said synchronizing means comprising:

means for applying a predetermined digital signal to one of said $n+1$ input circuits at said transmitting station during each cycle of operation; and means connected to and controlled by the corresponding decision device at said receiving station for applying the digital output signals from said decision device to said timing means at said receiving station during each cycle of operation for purposes of synchronization.

7. A digital communication system of the type described in claim 1 including synchronizing means for synchronizing said timing means at said transmitting station with said timing means at said receiving station, said synchronizing means comprising:

means for applying predetermined digital signals to a combination of the $n+1$ input circuits at said transmitting station during each cycle of operation;

means connected to and controlled by the corresponding combination of decision devices at said receiving station for producing an output signal when the predetermined digital signals appear at said combination of decision devices; and means for applying said output signal to said timing means at said receiving station during each cycle of operation for purposes of synchronization.

8. A digital communication system of the type described in claim 1 including synchronizing means for synchronizing the timing means at the transmitting station with the timing means at the receiving station, said synchronizing means comprising:

means for applying a characteristic analog signal to one of said $n+1$ input circuits at said transmitting station; and filter means connected to the corresponding integrator at said receiving station for applying a synchronizing signal to said timing means at said receiving station during each cycle of operation in response to said characteristic analog signal.

9. A digital communication system of the type described in claim 1 including synchronizing means for synchronizing the timing means at said receiving station to the signals from said transmission channel, said synchronizing means comprising:

means connected to and controlled by said integrators at said receiving station for producing an output signal for synchronizing said timing means at said receiving station when the contents of at least one of said integrators exceeds a certain threshold value.

10. A digital communication system of the type descriped in claim 1 including synchronizing means for synchronizing said timing means at said receiving station to the signals from said transmission channel, said synchronizing means comprising:

adding means connected to and controlled by said integrators at said receiving station for adding the contents of said integrators; and means connected to and controlled by said adding means for applying a synchronization signal to said timing means at said receiving station when the sum of the contents of said integrators exceeds a predetermined value.

11. A digital communication system of the type described in claim 2 including energy sharing means comprising:

sensing means connected to and controlled by said input circuits at said transmitting station for determining the number, $p$, of said input circuits which contain said positive potential during each transmission cycle;

gain control means connected to and controlled by said sensing means for increasing the gain transmission channel be a factor equal to $$\sqrt{\frac{n+1}{p}}$$

threshold control means connected to and controlled by said sensing means for increasing the threshold level of said decision devices at said receiving station by a factor equal to $$\sqrt{\frac{n+1}{p}}$$

12. A sampled data communication system including a transmitting station and a receiving station connected by a transmission channel;

said transmitting station comprising:

$n+1$ input circuits for receiving and storing $n+1$ successive input data samples during each transmission cycle;

an integrator for linearly superposing the input data samples stored in said input circuits;

an $n$-stage binary shift register PN sequence generator;

$n$ multipliers for multiplying the contents of the $n$ stages of said shift register PN sequence generator with the content of $n$ corresponding input circuits;

timing means for stepping said shift register PN sequence generator through $n$ steps during each transmission cycle;

a summation device for linearly superposing the outputs from said multipliers and from said remaining input circuit during each step so as to form a train of $n$ amplitude modulated pulses;

means for sampling the contents of said integrator and adding that sample to said train of pulses so as to form a train of $n+1$ amplitude modulated pulses for transmission over said transmission channel;

said receiving station comprising:

a first integrator for linearly superposing said $n+1$ amplitude modulated pulses from said transmission channel;

an $n$ stage binary shift register PN sequence generator identical to said PN sequence generator at said transmitting station;

$n$ multipliers for multiplying each of $n$ of said $n+1$ amplitude modulated pulses from said transmission channel with the contents of all $n$ stages of said shift register PN sequence generator;

timing means for stepping said shift register PN sequence generator through $n$ steps during each transmission cycle;

a further $n$ integrator for integrating the outputs from said multipliers;

means connected to and controlled by said timing means for applying the one of said $n+1$ amplitude modulated pulses, which is the output of said means for sampling the contents of said integrator in said transmitting station, directly to all of said integrators; and $n+1$ resamplers for resampling the contents of the $n+1$ integrators at the end of each transmission cycle so as to produce $n+1$ output data samples corresponding to the data samples applied to said input circuits at said transmitting station.

13. A digital communication system including, a transmitting station and a receiving station connected by a transmission channel;

said transmitting station comprising:

$n+1$ input circuits for receiving and storing $n+1$ successive digital input signals during each cycle of operation;

an integrator for linearly superposing the digital input signals stored in said input circuits;

an $n$-stage binary shift register PN sequence generator;

$n$ multipliers for multiplying the contents of the $n$ stages of said shift register PN sequence generator with the contents of $n$ corresponding input circuits;

timing means for stepping said shift register PN sequence generator through $n$ steps during each cycle of operation;

a summation device for linearly superposing the outputs from said multipliers and from said remaining input circuit during each step so as to form a train of $n$ composite amplitude samples;

means for sampling the contents of said integrator and adding that sample to said train of $n$ composite amplitude samples so as to form a train of $n+1$ composite amplitude samples for transmission over said transmission channel;

said receiving station comprising:

a first integrator for linearly superposing said $n+1$ composite amplitude samples from said transmission channel;

an $n$ stage binary shift register PN sequence generator identical to said PN sequence generator at said transmitting station;

$n$ multipliers for multiplying each of $n$ of said $n+1$ composite amplitude samples from said transmission channel with the contents of all $n$ stages of said shift register PN sequence generator;

timing means for stepping said shift register PN sequence generator through $n$ steps during each cycle of operation;

further $n$ integrators for integrating the outputs from said multipliers;

means connected to and controlled by said timing means for applying one of said $n+1$ composite amplitude samples which is the output of said means for sampling the contents of said integrator in said transmitting station, directly to all said integrators; and $n+1$ decision devices corresponding to said $n+1$ input circuits at said transmitting station, said $n+1$ decision devices being connected to and controlled by the contents of the $n+1$ integrators at said receiving station for producing digital output signals corresponding to the transmitted information.

References Cited

UNITED STATES PATENTS

| | | |
|---|---|---|
| 3,204,035 | 8/1965 | Ballard et al. |
| 3,384,715 | 5/1968 | Higuchi et al. |

ROBERT L. GRIFFIN, Primary Examiner

J. A. BRODSKY, Assistant Examiner

U.S. Cl. X.R.

179—15